US007695616B2

(12) United States Patent  
Corrado

(10) Patent No.: US 7,695,616 B2  
(45) Date of Patent: Apr. 13, 2010

(54) DEVICE FOR DISSOLVING SOLID SUBSTANCES IN WATER

(75) Inventor: Barani Corrado, Via Barani, 2, 41014 Castelvetro Di Modena (IT)

(73) Assignee: Barani Corrado (IT)

( * ) Notice: Subject to any disclaimer, the term of this patent is extended or adjusted under 35 U.S.C. 154(b) by 362 days.

(21) Appl. No.: 10/563,308

(22) PCT Filed: Jan. 23, 2004

(86) PCT No.: PCT/IT2004/000015

§ 371 (c)(1),
(2), (4) Date: Mar. 9, 2007

(87) PCT Pub. No.: WO2005/070837

PCT Pub. Date: Aug. 4, 2005

(65) Prior Publication Data

US 2007/0170102 A1    Jul. 26, 2007

(51) Int. Cl.
  *C02F 1/68* (2006.01)
  *B01D 11/02* (2006.01)
  *C02F 1/76* (2006.01)
(52) U.S. Cl. .............................. 210/167.11; 210/198.1; 210/205; 422/261; 422/276
(58) Field of Classification Search ............... 210/167.1, 210/167.11, 198.1, 205; 422/261, 275, 276, 422/282; 137/268
See application file for complete search history.

(56) References Cited

U.S. PATENT DOCUMENTS 1,978,536 A * 10/1934 Jeavons et al. .............. 422/109
3,160,352 A * 12/1964 Mollring ..................... 241/98
4,094,789 A *  6/1978 Kemper ...................... 96/206
5,137,694 A *  8/1992 Copeland et al. ........... 422/106
5,194,230 A *  3/1993 PeKarna et al. ............. 422/263
5,253,937 A * 10/1993 Scheimann et al. ......... 366/136
5,375,438 A * 12/1994 Babuin ....................... 68/17 R
5,810,043 A     9/1998 Grenier
5,928,608 A     7/1999 Levesque et al.
5,961,845 A    10/1999 Bricker et al.
6,701,953 B2 *  3/2004 Agosta ....................... 137/268
2002/0030004 A1 *  3/2002 Hammonds ............. 210/198.1
2005/0129596 A1 *  6/2005 Barani ....................... 422/264

FOREIGN PATENT DOCUMENTS

WO    WO-00/24992 A     5/2000
WO    WO-03/066534 A1   8/2003

OTHER PUBLICATIONS

International Search Report and Written Opinion of the International Searching Authority for PCT/IT2004/000015.

* cited by examiner

*Primary Examiner*—Fred Prince
(74) *Attorney, Agent, or Firm*—Sheridan Ross P.C.

(57) ABSTRACT

A device (1) for dissolving solid chemical substances in water is provided with: a container (2), which has a bottom portion (6) designed to contain an aqueous solution; a perforated loading chamber (9), which is set at the top of the bottom portion (6) and is designed to contain a solid chemical substance (10); and a spraying device (18) set within the loading chamber (9) for directing at least one jet of water onto the solid chemical substance (10). In use, the solid chemical substance (10) is set around the spraying device (18), and the jet of water is directed downwards and/or laterally so as not to wet the solid chemical substance (10) set above the spraying device (18). In this way, there is obtained a relatively gradual dissolution of the solid chemical substance (10) and a lower development of gaseous substances having an unpleasant smell.

17 Claims, 4 Drawing Sheets

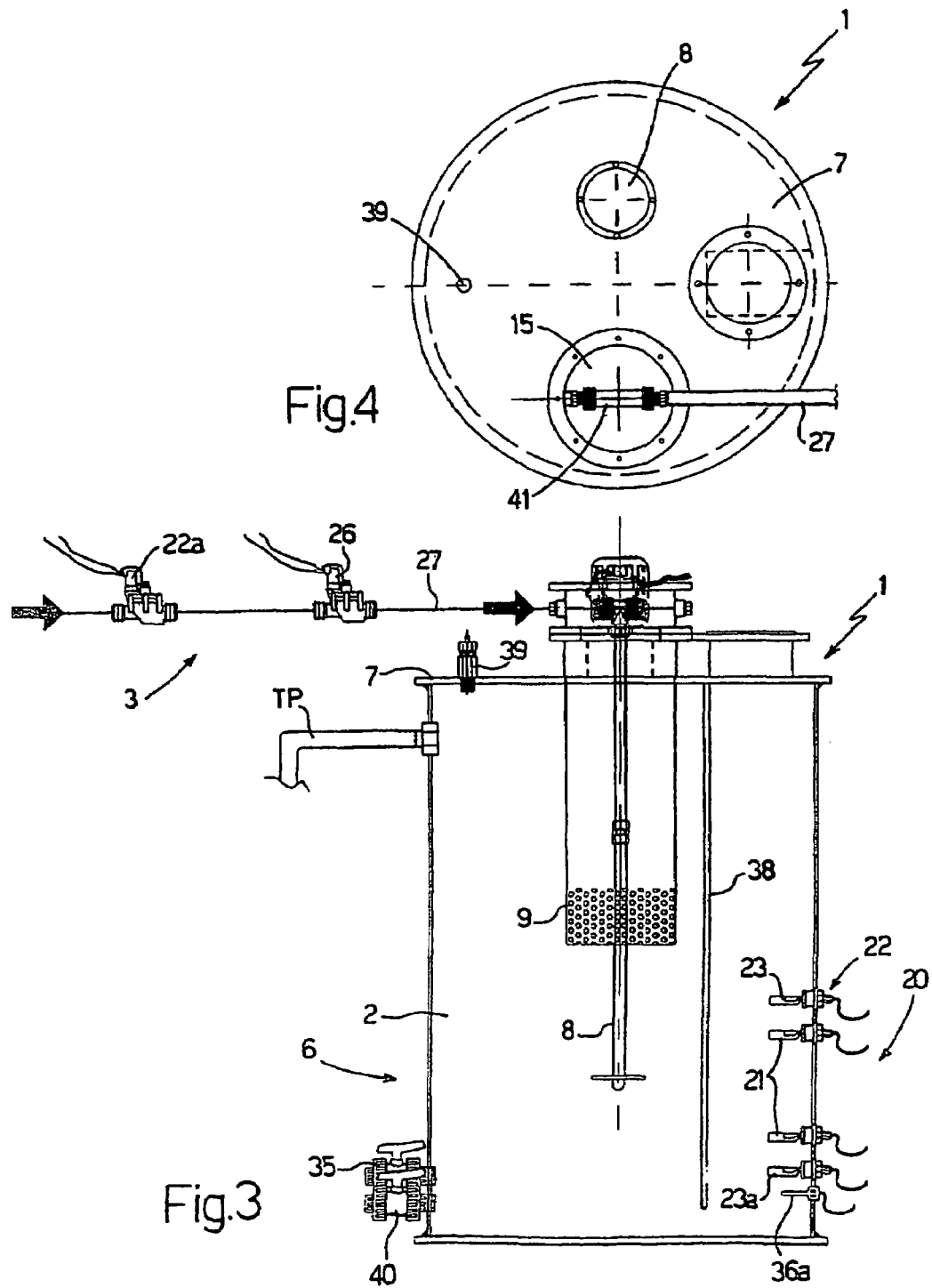

DEVICE FOR DISSOLVING SOLID SUBSTANCES IN WATER

TECHNICAL FIELD

The present invention relates to a device for dissolving a solid chemical substance in water.

The present invention finds advantageous application in the treatment of water for swimming pools and drinking water, in particular for optimal dissolution of solid derivatives of chlorine (calcium hypochlorite, isocyanurates, mixtures or derivatives thereof, etc.), to which the ensuing treatment will make explicit reference, without, however, this implying any loss of generality.

BACKGROUND ART

In the field of devices for dissolution of a solid chemical substance in water, in particular in the field of the chlorination of water, it is known practice to use a device for dissolving solid substances in water, comprising: a container, which has a collecting portion for containing an aqueous solution; supporting means, which are perforated (or permeable to liquids), are arranged above the collecting portion and are designed to support the solid chemical substance; and water-supplying means arranged beneath the supporting means for directing at least one jet of water from beneath upwards onto the supporting means themselves.

Usually, the jet of water directed from the bottom upwards, in addition to wetting a bottom layer of the solid chemical substance bringing about dissolution thereof, also wets top layers. In this way, the dissolution of the solid chemical substance occurs in a way that is not very gradual. This may bring about a development of relatively high levels of gases having unpleasant smell and phenomena of depositing or compacting of the solid chemical substance on the supporting means or on the bottom of the container.

The purpose of the present invention is to provide a device for dissolving a solid chemical substance, which is free from the drawbacks described above and, at the same time, is simple and economically advantageous to produce.

DISCLOSURE OF INVENTION

In accordance to the present invention, there is provided a device for dissolving a solid chemical substance according to what is recited in Claim 1 and, preferably, in any one of the subsequent claims depending directly or indirectly upon Claim 1.

BRIEF DESCRIPTION OF THE DRAWINGS

The present invention will now be described with reference to the annexed drawings, which illustrate non-limiting examples of embodiment thereof and in which:

FIG. 3 is a schematic illustration of a front cross section of a device for dissolving a solid chemical substance made according to a further embodiment of the present invention;

FIG. 4 is a plan view of the device of FIG. 3; and

BEST MODE FOR CARRYING OUT THE INVENTION

Figure 1:
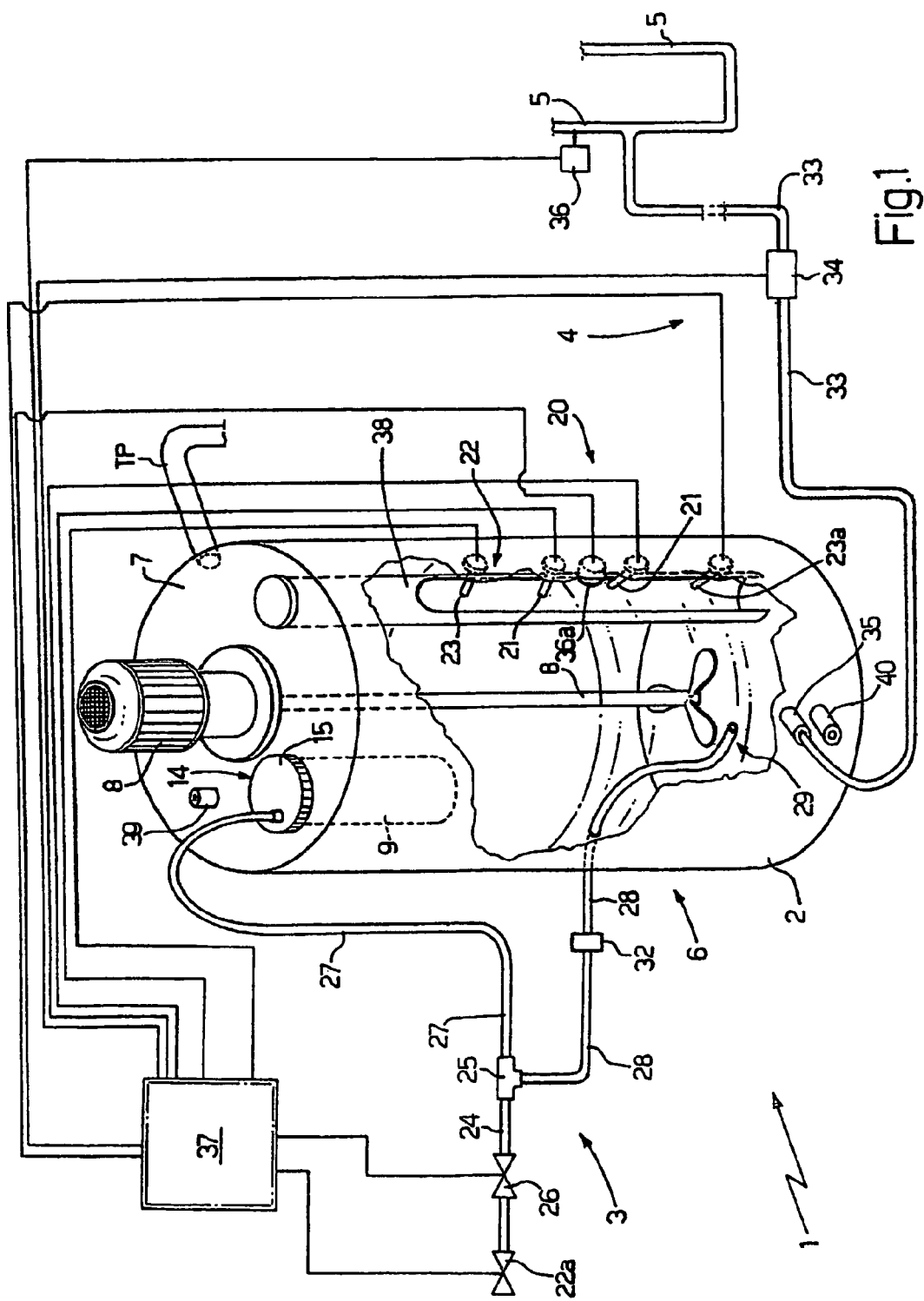
FIG. 1 is a perspective and schematic view, with some items removed for reasons of clarity, of a device for dissolving a solid chemical substance in water made according to one embodiment of the present invention and connected to a recirculation line of a swimming pool or to a hydraulic circuit.

In FIG. 1, designated as a whole by 1 is a device for dissolving a solid chemical substance 10, in particular for the chlorination of water for swimming pools and drinking water, comprising: a cylindrical container 2, within which the solid chemical substance is dissolved in water so as to obtain an aqueous solution; a supply unit 3 for conveying the water coming from a water supply (of a known type and not illustrated) into the container 2; and a drainage unit 4 for conveying the aqueous solution from the container 2 to a swimming pool or to a hydraulic circuit, of which a portion of a recirculation circuit 5 is illustrated in FIG. 1.

The container 2 is set vertically, is provided with a collecting portion 6, which is designed to contain the aqueous solution, and is delimited at the top by a cover or lid 7. The container 2 moreover comprises a mechanical stirrer 8 passing through the cover or lid 7 and designed to maintain under stirring the aqueous solution present in the collecting portion 6 so as to prevent precipitation of saline particles with a consequent creation of deposits within the collecting portion 6.

The device 1 further comprises a loading chamber 9, which is set above the collecting portion 6 within the container 2 and is designed to contain the solid chemical substance 10 for chlorination. In particular, the solid chemical substance 10 is in the form of tablets and contains calcium hypochlorite, isocyanurate and mixtures and/or derivatives thereof.

According to further embodiments (not illustrated), the solid chemical substance can be in the form of powder or granules and can contain other types of salts.

The loading chamber 9 has a substantially cylindrical shape with a circular base and is provided with a bottom wall 11 that is perforated (and hence permeable to liquids); said bottom wall 11 being designed to support, at the bottom, the solid chemical substance 10, and with a perforated side wall 12 designed to contain laterally the solid chemical substance 10 itself. Typically, the holes in the side wall 12 extend up to a distance of 5-15 cm from the bottom wall 11.

The sizes of the holes of the walls 11 and 12 are chosen according to the solid chemical substance 10; in particular, when the solid chemical substance 10 is in the form of tablets, the dimensions of the holes of the walls 11 and 12 are chosen according to the size of the tablets.

According to embodiments not illustrated the cover or lid 15 can be replaced by a loading hopper.

The loading chamber 9 is anchored in a removable way to the cover or lid 7 and has one top end 13 of its own set in a position corresponding to a circular opening 14 of the cover or lid 7 itself.

Figure 2:
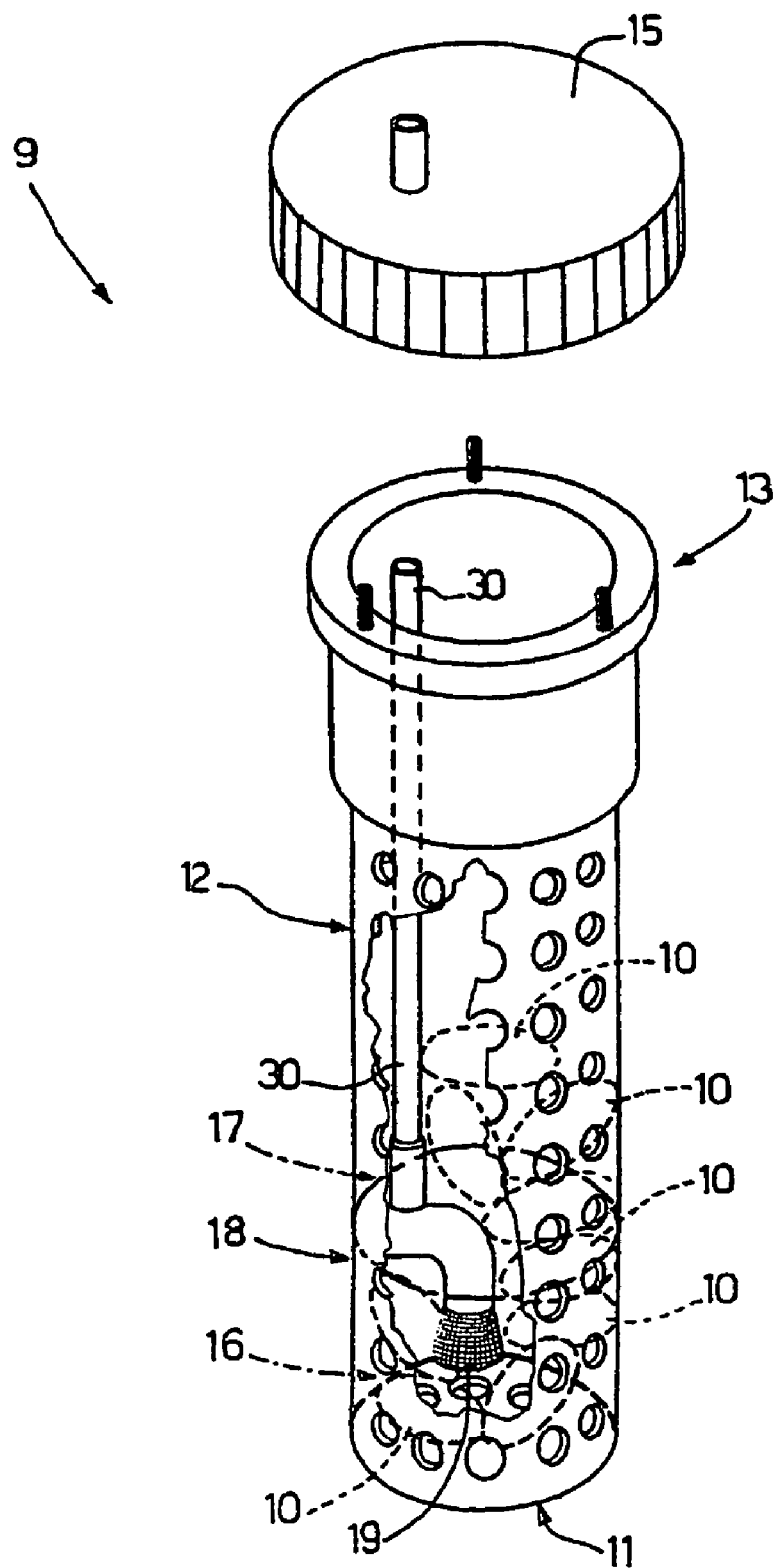
FIG. 2 is a view, at an enlarged scale, of a detail of FIG. 1.

The loading chamber 9 further comprises a cover or lid 15, which can be connected by means of blocking elements (of a type in itself known and illustrated schematically in FIG. 2) to the top end 13. Preferably, the cover or lid 15 is transparent so as to enable an operator to check, in use, what is occurring inside the loading chamber 9.

The loading chamber 9 has a dissolving portion 16, which is delimited at the bottom by the bottom wall 11 and where, in use, the solid chemical substance 10 is dissolved, and a storage portion 17, which is set above the dissolving portion 16 and is designed to contain the solid chemical substance 10 above the dissolving portion 16 itself.

The device 1 further comprises a water-dispersion unit 18, which is located within the loading chamber 9 (see FIG. 2) and is designed to direct at least one jet of water towards the solid chemical substance 10 contained in the dissolving portion 16. In particular, the dispersion unit 18 comprises a spraying head 19, which is set at a top end of the dissolving portion 16 and is designed to direct the water downwards and/or laterally, but not upwards, substantially in such a way as not to wet the solid chemical substance 10 contained in the storage portion 17. Typically, the spraying head 19 is located at 5-15 cm from the bottom wall 11.

In this way, the dissolution of the solid chemical substance 10 occurs in a very gradual way; this brings about a low development of gases having an unpleasant smell and enables the correct concentrations of the solute within the aqueous solution, with a consequent limited possibility of creation of deposits due to the precipitation of the solid substances dissolved.

The device 1 further comprises a level-detection unit 20, which is designed to detect the level of the aqueous solution within the collecting portion 6. The detection unit 20 comprises two floats 21 (of a known type and illustrated schematically), which are substantially identical to one another and are set at a distance from one another, one above the other, within the collecting portion 6 and beneath the loading chamber 9. Each float 21 can move between a lowered position and a raised position and is provided with a corresponding sensor (of a known type and not illustrated), designed to detect the position of the float 21 itself. In use, each float 21 is in the raised position when the aqueous solution reaches or exceeds the float 21 itself.

The device 1 further comprises a safety unit 22 (of a known type and illustrated schematically), which is designed to block the water conveyed to the dispersion unit 18 in the case where, in use, the level of the aqueous solution within the collecting portion 6 exceeds both of the floats 21 and reaches a given maximum safety level. The safety unit 22 has a float 23, set above the collecting portion 6, above the floats 21 and beneath the loading chamber 9. The position of the float 23 defines the maximum safety level.

The supply unit 3 comprises a duct 24 for conveying the water coming from the water mains supply (known and not illustrated) to a union tee 25, a solenoid valve 26, and a solenoid valve 22a, which are arranged along the duct 24 for regulating the flow of the water in the duct 24 itself. The solenoid valve 22a is set upstream of the solenoid valve 26 and is designed to block the flow of the water in the duct 24 when, during use, the level of the aqueous solution reaches or exceeds the floats 23.

The supply unit 3 further comprises a pipe 27 for conveying the water from the union tee 25 to the water-dispersion unit 18, and a pipe 28 for conveying the water from the union tee 25 directly to the collecting portion 6; the pipe 27 is connected to a pipe 30 of the dispersion unit 18.

The pipe 28 has a first end connected to the union tee 25 and a second end 29 resting on a bottom of the container 2 in such a way that, in use, the jet of water coming out of the second end 29 will mix the aqueous solution present within the collecting portion 6.

The supply unit 3 further comprises a tap 32 (schematically illustrated in FIG. 1), which can be actuated manually, is set along the pipe 28 and is designed to regulate the flow of water in the pipe 28 itself.

The drainage unit 4 comprises a duct 33 for connection between the collecting portion 6 and the recirculation circuit 5, and a dosage system 34 (in particular, a pump), which is set along the duct 33 and is designed to supply the aqueous solution from the container 2 to the recirculation circuit 5 along the duct 33. The duct 33 is connected to the container 2 via a valve 35. The dosage system 34 is, moreover, electrically connected to a safety float 23a, which is set in the collecting portion 6 underneath the floats 21. The float 23a is mobile between a lowered position and a raised position and is provided with a sensor (of a known type and not illustrated) designed to detect the position of the float 23a itself. In use, the float 23a is in a raised position when the aqueous solution reaches or exceeds the float 23a itself. When the float 23a is in the lowered position, an alarm device (of a type in itself known and not illustrated) is activated, and the dosage system 34 and the mechanical stirrer 8 are blocked.

The device 1 further comprises a concentration sensor 36, which is designed to detect the concentration of solute within the aqueous solution present in the recirculation circuit 5 upstream of the duct 33.

The device 1 further includes a concentration sensor 36a, which is designed to detect the concentration of solute within the aqueous solution present in the collecting portion 6. Should, in use, the sensor 36a detect a level of concentration of solute falling outside a given range, an alarm device (of a type in itself known and not illustrated) is activated, and the entire device 1 is blocked.

The device 1 further comprises a control unit 37 electrically connected to the solenoid valves 26 and 22a, to the dosage system 34, to the sensors (known and not illustrated) of the floats 21, 23 and 23a and to the sensors 36 and 36a.

The control unit 37 is designed to actuate the dosage system 34 according to the amounts detected by the sensor 36 so as to maintain the concentration of solute in the water of the swimming pool, i.e., in the water present in the recirculation circuit 5, between a minimum level of concentration and a maximum level of concentration. In particular, in use, when the concentration of solute detected by the sensor 36 is relatively close to the minimum concentration, the control unit 37 actuates the dosage system 34; when, instead, the concentration of solute detected by the sensor 36 is relatively close to the maximum concentration, the control unit 37 stops the dosage system 34.

The control unit 37 is, moreover, designed to control the solenoid valve 26 in such a way that the level of the aqueous solution within the collecting portion 6 will be maintained between a minimum level and a maximum level. In particular, during use, when both of the floats 21 are in their lowered positions, the control unit 37 opens the solenoid valve 26, whereas, when both of the floats are in their raised positions, the control unit 37 closes the solenoid valve 26. It is to be noted that the cycle of dissolution of the solid chemical substance 10 resumes only when both of the floats 21 are in their lowered positions.

The device 1 further comprises a shielding element 38, which has a substantially tubular shape and is set vertically in the proximity of the floats 21 within the container 2. The shielding element 38 has a longitudinal notch or groove and is designed to shield the floats 21, 23 and 23a from the wave motion caused by the mechanical stirrer 8 and/or from the jet of water coming out of the end 29 of the pipe 28. The top wall of the shielding element 38 is transparent and, therefore, in use, enables an operator to check what is occurring in the groove of the shielding element 38 itself.

The container 2 has an overflow pipe TP set above the floats 23 and the collecting portion 6. The pipe TP is designed, in the case of malfunctioning of the floats 23 and 21 and/or of the solenoid valves 22 and 26a, to run off the aqueous solution so that the aqueous solution itself will not reach the cover or lid 7 and overflow from the container 2.

The device 1 is further provided with an air valve 39 set on the cover or lid 7 and designed to release the gases which, during use, may develop within the container 2.

Finally, the device 1 comprises an emptying valve 40 set on the container 2, in the proximity of a bottom wall of the container 2 itself beneath the valve 35. The emptying valve 40 can be used for emptying off the aqueous solution completely from the collecting portion 6 at the end of use of the device 1 or else during the operations for washing of the container 2 itself.

In use, the jet of water coming out of the end 29 of the pipe 28, and the mechanical stirrer 8 maintain the aqueous solution present in the collecting portion 6 under stirring. In this way, precipitation of salts, principally calcium carbonate and calcium sulphate (should calcium hypochlorite or similar products be used), and, consequently, creation of deposits within the portion 6, becomes relatively unlikely.

When, in use, the device 1 is started up again after a period of inactivity, the control unit 37 starts filling the collecting portion 6 with the aqueous solution and disconnects the concentration sensor 36a for a period of time pre-set by an operator in order to prevent the device 1 from getting obstructed on account of the wrong concentration of the solute. After the pre-set period of time, or in any case when the operator deems it appropriate, the control unit 37 starts the drainage unit 4 and the mechanical stirrer 8.

Figure 5:
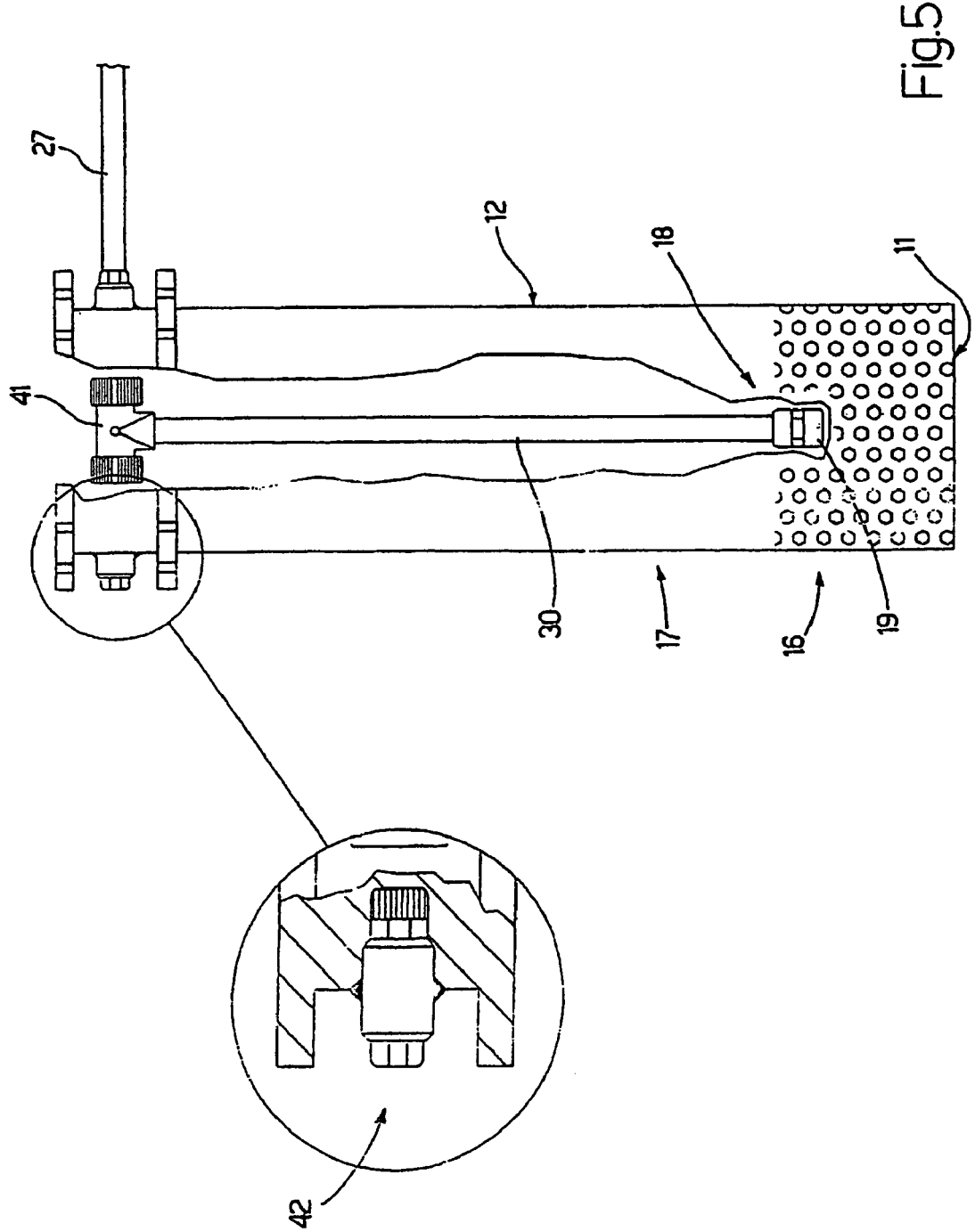
FIG. 5 is a view at an enlarged scale of a detail of FIG. 5.

According to the embodiment illustrated in FIGS. 3, 4 and 5, the device 1 is not provided with the union tee 25 of the pipe 28 and of the tap 32. In this case, the aqueous solution is kept under stirring just by the mechanical stirrer 8, and the pipe 27 is connected to the dispersion unit 18 via a union tee 41; the union tee 41 has a plugged end 42 opposite to the pipe 27.

According to an embodiment not illustrated, the pipe 28 is replaced by a recirculation unit, which is designed to take the aqueous solution from the portion 6 and re-introduce it into the portion 6 itself. The aforesaid recirculation unit comprises a channel-shaped duct and a pump designed to supply the water along the aforementioned duct. In use, the jet of water coming out of an end of said duct maintains the aqueous solution contained in the collecting portion 6 stirred.

The invention claimed is:

1. A device for dissolving a solid chemical substance with water so as to obtain an aqueous solution; the device comprising:
 a container, which has a collecting portion for containing the aqueous solution, and a loading chamber, which is set above the collecting portion, is designed to contain the solid chemical substance and is provided with supporting means, designed to support the solid chemical substance, and water-dispersion means for directing at least one first jet of water on said solid chemical substance;
 wherein the water-dispersion means are arranged within the loading chamber above the supporting means and are designed to direct the first jet of water only laterally and/or downwards so as to wet the solid chemical substance;
 supplying means for supplying the water to the container, drainage means for taking the aqueous solution from the container, level-detection means for detecting the level of the aqueous solution within the collecting portion, a control unit for controlling the supplying means, which is connected to the level-detection means so as to maintain the level of the aqueous solution within the container substantially between a maximum level and a minimum level; and
 shielding means for shielding said level-detection means from the wave motion of the aqueous solution.

2. A device according to claim 1,
 wherein the solid chemical substance, is positioned underneath and/or laterally with respect to the water-dispersion means; the loading chamber having a dissolving portion where, in use, the solid chemical substance is dissolved by the first jet of water, and a storage portion, which is set above the dissolving portion and is designed to contain the solid chemical substance above the dissolving portion itself; the dissolving portion having a top end; the water-dispersion means being arranged in the loading chamber at the top end of the dissolving portion.

3. The device according to claim 1, in which said water-dispersion means comprise a spraying head.

4. The device according to claim 1, in which the loading chamber comprises means for lateral containment, which are designed to support the solid chemical substance laterally.

5. The device according to claim 4, in which the lateral-containment means are permeable to liquids.

6. The device according to claim 1, in which said supporting means are permeable to liquids.

7. The device according to claim 1, and comprising mixing means which are arranged in a position corresponding to the collecting portion and are designed to maintain the aqueous solution stirred.

8. The device according to claim 7, in which said mixing means comprise spraying means for emitting at least one second jet of water.

9. The device according to claim 7, in which said mixing means comprise at least one mechanical stirrer.

10. The device according claim 1, and comprising:
 supplying means for supplying the water within the container;
 drainage means for supplying the aqueous solution from the container outwards;
 and a control unit for actuating the drainage means.

11. The device according to claim 10, in which the drainage means are designed to supply the aqueous solution to an external circuit, in particular a swimming pool; the device comprising first concentration-sensing means for detecting the concentration of solute in the aqueous solution of the external circuit; the control unit being connected to the first concentration-sensing means and being designed to actuate the drainage means so as to maintain the concentration of the chemical substance in the aqueous solution within the collector between a maximum concentration and a minimum concentration.

12. The device according to claim 1, and comprising supplying means for supplying the water to the container, drainage means for taking the aqueous solution from the container, level-detection means for detecting the level of the aqueous solution within the collecting portion, a control unit for controlling the supplying means, which is connected to the level-detection means so as to maintain the level of the aqueous solution within the container substantially between a maximum level and a minimum level.

13. The device according to claim 12, and comprising a safety unit, which is connected to the control unit and is designed to detect a safety level of the aqueous solution within the collecting portion and to arrest the supplying means when the aqueous solution reaches said safety level; the safety level being higher than the maximum level.

14. The device according to claim 12, and comprising sensor means designed to detect a level of arrest of the aqueous solution within said collecting portion; the level of arrest being lower than said minimum level; in use, when said sensor means detect said level of arrest, said drainage means being arrested.

15. The device according to claim 12, and comprising second concentration-sensing means, which are connected to the control unit and are designed to detect the concentration within the collecting portion.

16. The device according to claim 1, and comprising an air valve for releasing the gases which develop during dissolution of said solid chemical substance outside said container.

17. The device according to claim 1, in which the container comprises an overflow pipe, which is arranged above the collecting portion and is designed to prevent the aqueous solution from overflowing from the container itself.

* * * * *

UNITED STATES PATENT AND TRADEMARK OFFICE
CERTIFICATE OF CORRECTION

PATENT NO. : 7,695,616 B2
APPLICATION NO. : 10/563308
DATED : April 13, 2010
INVENTOR(S) : Corrado Barani It is certified that error appears in the above-identified patent and that said Letters Patent is hereby corrected as shown below:

Under Section (12), the patentee's name should be changed to "Barani"

Under Section (75), the Inventor's name should be changed to "Corrado Barani"

Under Section (73), the Assignee's name should be changed to "Corrado Barani"

Signed and Sealed this

Eighth Day of June, 2010

David J. Kappos
*Director of the United States Patent and Trademark Office*